United States Patent [19]

Miyake et al.

[11] Patent Number: 6,041,052
[45] Date of Patent: Mar. 21, 2000

[54] CALL CONTROL SYSTEM FOR A SUBSCRIBER TRANSMISSION DEVICE

[75] Inventors: Shoji Miyake; Toru Inaba, both of Yokohama; Eiji Koda, Kawasaki, all of Japan

[73] Assignee: Fujitsu Limited, Kanagawa, Japan

[21] Appl. No.: 08/792,063

[22] Filed: Feb. 3, 1997

[30] Foreign Application Priority Data

Feb. 2, 1996 [JP] Japan .................................. 8-017366

[51] Int. Cl.⁷ .............................. H04J 3/12; H04M 7/06; H04Q 11/04
[52] U.S. Cl. ......................... 370/360; 370/384; 370/524; 379/220; 379/230; 379/269
[58] Field of Search ................................. 370/351, 31–7, 370/360, 384, 385, 522, 524; 379/93.01, 93.06, 93.07, 93.15, 219, 220, 229, 230, 268, 269, 399

[56] References Cited

U.S. PATENT DOCUMENTS

| | | | |
|---|---|---|---|
| 4,592,047 | 5/1986 | Fundneider | 370/524 |
| 4,654,841 | 3/1987 | Ekberg | 370/386 |
| 4,757,526 | 7/1988 | Foster et al. | 370/385 |
| 5,042,062 | 8/1991 | Lee et al. | 370/524 |
| 5,195,124 | 3/1993 | Ishioka | 379/27 |
| 5,453,989 | 9/1995 | Kitayama | 370/241 |
| 5,471,517 | 11/1995 | Nakagawa | 379/29 |
| 5,473,682 | 12/1995 | Tanaka | 379/372 |
| 5,517,563 | 5/1996 | Norell | 379/230 |
| 5,533,114 | 7/1996 | Ballard et al. | 379/230 |
| 5,640,387 | 6/1997 | Miyaoh | 370/359 |

FOREIGN PATENT DOCUMENTS

| | | |
|---|---|---|
| 1-212936 | 8/1989 | Japan . |
| 4-57140 | 2/1992 | Japan . |
| 4-57446 | 2/1992 | Japan . |
| 4-79634 | 3/1992 | Japan . |
| 4-79652 | 3/1992 | Japan . |
| 4-162863 | 6/1992 | Japan . |
| 4-355829 | 12/1992 | Japan . |
| 4-371057 | 12/1992 | Japan . |
| 5-30186 | 2/1993 | Japan . |
| 5-63799 | 3/1993 | Japan . |
| 5-136772 | 6/1993 | Japan . |
| 5-227279 | 9/1993 | Japan . |
| 5-260163 | 10/1993 | Japan . |
| 5-268187 | 10/1993 | Japan . |
| 5-308443 | 11/1993 | Japan . |
| 5-327873 | 12/1993 | Japan . |
| 6-77925 | 3/1994 | Japan . |
| 6-87193 | 3/1994 | Japan . |

*Primary Examiner*—Alpus H. Hsu
*Attorney, Agent, or Firm*—Helfgott & Karas, P C.

[57] ABSTRACT

A call control system can cope with a plurality of exchanges that support call control messages issued in accordance with different protocols. The call control system for use in a subscriber transmission device is located along a transmission path between a plurality of subscribers and a plurality of exchanges. The call control system includes call control message terminal sections, each of which is provided for each of the protocols that are supported by the exchanges for terminating a data link for sending and receiving a call control message to and from a corresponding exchange. A call change data processor is provided in the system for detecting a call and a clearance by a subscriber, and for requesting the call control message terminal section, which supports a protocol that corresponds to a protocol of an exchange to which is connected to the subscriber, to transmit the detected contents to the exchange that supports the protocol.

25 Claims, 16 Drawing Sheets

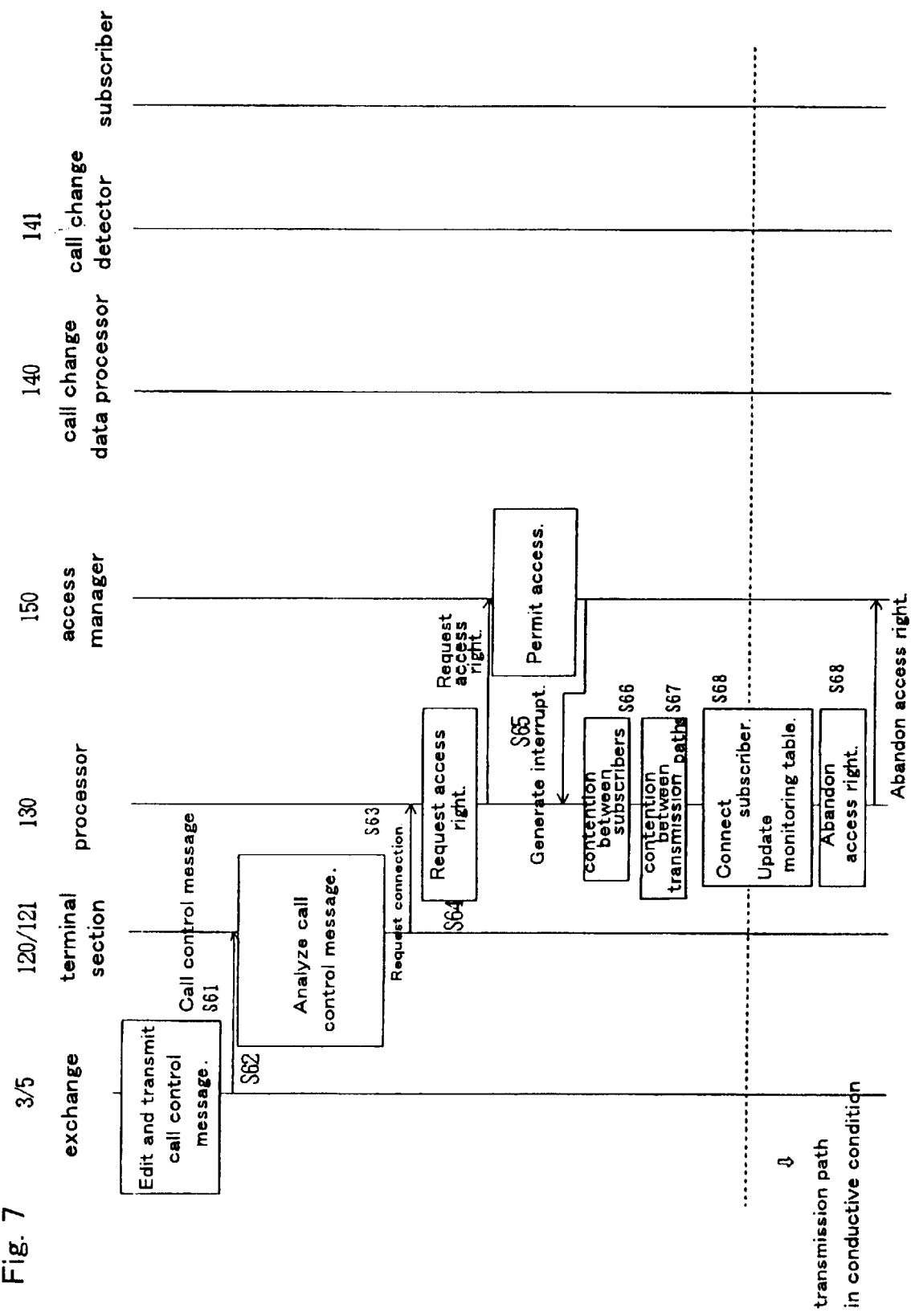

Fig. 15 PRIOR ART

| subscriber number | #1 | #2 | #3 | #4 | #5 | #6 | #7 | #8 |
|---|---|---|---|---|---|---|---|---|
| calling 1, cleared: 0 | 1 | 0 | 1 | 0 | 1 | 0 | 0 | 0 |
| subscriber number | #9 | #10 | #11 | #12 | #13 | #14 | #15 | #16 |
| calling 1, cleared: 0 | 0 | 0 | 0 | 0 | 0 | 1 | 0 | 0 |
| subscriber number | #17 | #18 | #19 | #20 | #21 | #22 | #23 | #24 |
| calling 1, cleared: 0 | 0 | 0 | 0 | 0 | 1 | 0 | 0 | 0 |
| subscriber number | #25 | #26 | #27 | #28 | #29 | #30 | #31 | #32 |
| calling 1, cleared: 0 | 0 | 1 | 0 | 0 | 1 | 0 | 0 | 0 |
| subscriber number | #33 | #34 | #35 | #36 | #37 | #38 | #39 | #40 |
| calling 1, cleared: 0 | 0 | 0 | 0 | 0 | 0 | 0 | 0 | 0 |
| subscriber number | #41 | #42 | #43 | #44 | #45 | #46 | #47 | #48 |
| calling 1, cleared: 0 | 0 | 0 | 1 | 0 | 0 | 0 | 0 | 0 |
| subscriber number | #49 | #50 | | | | | | |
| calling 1, cleared: 0 | 0 | 1 | | | | | | |

Fig. 17 PRIOR ART

| service data / subscriber number | connection /no-connection | connection form | | | ISDN subscriber identification | | | |
|---|---|---|---|---|---|---|---|---|
| | | Dynamic Assignment (A) | Semi-Permanent Assignment (B) | Permanent Assignment (C) | control D-CH | data 1 B1-CH | data 2 B2-CH | ...... |
| #1 | ○ | ○ | | | ○ | | | |
| #2 | | ○ | | | | | | |
| #3 | ○ | | | | | | | |
| #4 | ○ | | ○ | | | ○ | | |
| #46 | | | | | | | | |
| #47 | | | | | | | | |
| #48 | ○ | | | ○ | | | ○ | |
| #49 | | | | | | | | |
| #50 | | | | | | | | |

CALL CONTROL SYSTEM FOR A SUBSCRIBER TRANSMISSION DEVICE

BACKGROUND OF THE INVENTION

1. Field of the Invention

The present invention relates to a call control system for a subscriber transmission device that is located between a transmission path side, which is connected to an exchange, and a subscriber.

2. Related Arts

FIG. 12 is a diagram illustrating a digital signal transmission system. A subscriber transmission device (RT: Remote Terminal) 1 is located between a transmission path side I, which is connected to an exchange, and a subscriber side II. On the transmission path side I, DS1 signals of 1.5 Mbps are transmitted from a digital exchange 3 to an ADM (Add Drop Multiplexer) 2 and are multiplexed to an optical signal of 150 Mbps by the ADM 2, and the optical signal is transmitted across an optical transmission path OC-3 (optical transmission path for 155 Mbps that is specified by SONET standards) for the connection to the subscriber transmission device (RT) 1.

On the subscriber side II, the subscriber transmission device (RT) 1 is connected to a carrier serving area 4 across a narrow band subscriber line 40; a wide band subscriber line 41, for transmission of signals of 45 Mbps, such as DS1 and DS3 signals; or an optical fiber subscriber line 42, each of the specified lines being connected to a local switch or to a specific service.

The subscriber transmission device (RT) 1 comprises an add drop optical multiplexer 10 and a call control system, which provides various subscriber services and which has a function to sort and transmit signals on subscriber lines to exchange devices by using its electronic cross connect function.

FIG. 13 is a block diagram illustrating the conventional structure of the call control system 11 of the subscriber transmission device (RT) 1. In FIG. 13, the add drop optical multiplexer 10 of the subscriber transmission device (RT) 1 is omitted, and only the call control system 11 is shown. Further, representations of the transmission path side I and the subscriber II are simplified, and only their conceptual representations, which are connected to an exchange and to subscribers, respectively, are depicted.

As is shown in FIG. 12, the transmission path side I exchanges signals with the exchange 3, while as for the subscriber II, subscriber lines (channel CH), which are equivalent to 50 subscribers, are connected to a single unit package in the call control system 11. As the number of unit packages of the call control system 11 is increased, the number of subscriber lines (channels CH) that can be connected thereto increases proportionately.

The function of the call control system 11 will now be explained while referring to FIG. 13. The exchange 3 supports a call control message in consonance with a protocol (p). Therefore, the call control system 11 has the following functional blocks.

The function of a call control message terminal section 110 is the transmission of call control messages. A call control processor 111 receives, from the call control message terminal section 110, a notice of the contents that are required by the exchange 3, in consonance with a requested/accepted call by a subscriber, and connects the subscriber to the transmission path.

A call change detector 112 detects changes in a call and the clearance of the call for a subscriber, and requests that the call control message terminal section 110 notify the exchange 3 of the data detected. A transmission path supply main memory 113 is a storage device for the connection to and the clearance of a transmission path for each subscriber. A subscriber service management table 114 is employed to manage the supply condition and the connection form for a transmission path to a subscriber. A new call and clearance condition table 115 receives the latest call and the clearance data for each subscriber by using hardware.

A previous call/clearance condition management table 116 is provided in which old data are stored in order to detect a call change and a clearance, when compared with the latest call/clearance data in the table 115.

The primary operation in the thus structured call control system will now be described.

FIG. 14 is a diagram illustrating the operational sequence for the detection of a call change for a subscriber, and the transmission of the data detected, that is, a call control message, to a corresponding exchange.

In a call change detection process, the call change detector 112 periodically compares all the areas in the new call/clearance (signaling) condition table 115 with those in the previous call/clearance condition management table 116 (step S1).

An example of the new call/clearance (signaling) condition table 115 is shown in FIG. 15. The table 115 has areas in which a call "1" and a clearance "0" are recorded for each subscriber number #1 through #50.

The previous call/clearance condition management table 116 has the same structure as that of the new call/clearance (signaling) condition table 115, and a call "1" and a clearance "0" are recorded for each of the subscribers #1 through #50.

When the new call/clearance (signaling) condition table 115 is periodically compared with the previous call/clearance condition management table 116, changes in the condition can be detected. More specifically, in FIG. 14, when a subscriber makes a call (step S2), the change in the signaling data are reflected in the new call/clearance (signaling) condition table 115. The call condition can be detected by comparing such a table 115 with the previous call/clearance condition management table 116 (step S3).

Then, the transmission of the detected contents to the exchange 3 is requested of the call control message terminal section 110 (step S4). The call control message terminal section 110 edits a call control message in consonance with the data obtained by the call change detector 112, and transmits the edited message to the exchange 3 (step S5).

At this time, the call change detector 112 updates the entries in the previous call/clearance condition management table 116, by copying the detected contents to a corresponding subscriber area (step S6), to prepare for the detection of the next condition change.

FIG. 16 is a diagram showing the operational sequence for the connection of a subscriber with a transmission path upon receipt of a call control message from the exchange, and for the examination to determine whether a contention state exists between subscribers and between transmission paths.

A call control message that indicates a transmission path been supplied from the exchange 3 to a subscriber is edited, and the resultant message is sent to the call control message terminal section 110 (step S11). Upon receipt of the call control message, the call control message terminal section 110 analyzes the message and requests the call control processor 111 connect a subscriber with a transmission path that is designated by the exchange 3 (step S12).

Upon receipt of the connection request, the call control processor 111 searches the subscriber service management table 114 to determine whether or not a contention state exists between subscribers. An example of the subscriber service management table 114 is shown in FIG. 17. For each subscriber, a connection or non-connection (a 0 indicates a connected state), a connection form (a corresponding form is indicated by the entry of a 0), and the identification of an ISDN subscriber (a 0 is provided in a corresponding column) are recorded in the table 114.

The connection form is categorized as consisting of a dynamic assignment, a semi-permanent assignment or a permanent assignment.

As the outline of a service that corresponds to the dynamic assignment, in consonance with the request/acceptance of a call by a subscriber, the subscriber is connected to a transmission path that is supplied by the exchange 3. Disconnection from the transmission path is also instructed by the exchange 3, in consonance with the clearance of the call by the subscriber. The service for the dynamic assignment is, for example, a general subscriber service, a public telephone network service, or a line switching ISDN service.

To provide service for a semi-permanent assignment, a maintenance operator instructs, via a maintenance system, the connection and disconnection of a fixed, specified subscriber with a designated transmission path for a example, are used for this service.

As for a permanent assignment, a maintenance operation sets an operational form of the maintenance system, and unconditionally determines the correspondence between subscribers and transmission paths to perform connection and disconnection. An operational mode that is specified by protocol, for example, is used for this service.

The call control processor 111 determines whether or not specified subscribers are in contention for a connection (step S13). In this process for determining whether subscribers are in contention, an examination is made to ascertain whether or not a subscriber for which the exchange 3 makes assignments is already connected to a transmission path that is different from the transmission path that is designated by the exchange 3.

The process performed when it is established that subscribers are in contention differs depending on the error process that is specified by the protocol that is supported by the exchange 3.

The determination of whether a contention state is made by referring to the contents of the service data that are held for each subscriber in the subscriber service management table 114, an explanation for which is given in FIG. 17.

The call control processor 111 searches through all the areas for supplying transmission paths in the main memory 113, the structure of which is shown in FIG. 18, and determines whether a state of contention exists in the assignment of transmission paths (step S14).

As is shown in FIG. 18, in the main memory 113 for supplying transmission paths there are areas in which logical address data for transmission path connections are set for each subscriber number. Thus, the occurrence of a contention state involving the transmission paths can be determined by examining whether or not the logical addresses for the transmission path connections that are set in the areas correspond.

More specifically, in the processing for searching for the occurrence of a contention state involving transmission paths, a check is performed to determine whether or not a subscriber other than the subscriber that is specified by the exchange 3 is already connected to a transmission path that is designated by the exchange 3. As well as the process performed when a state wherein subscribers are in contention has occurred, the process performed when a contention state involving the transmission paths has occurred differs in consonance with the error processing specified for the protocol that is supported by the exchange 3.

When the call control processor 111 ascertains that a contention state has not occurred involving subscribers and transmission paths, the subscriber is connected with the transmission path that is designated, from among those that are supplied by the main memory 113, by the exchange 3 (step S15). At this time, the call control processor 111 updates the subscriber service management table 114, in consonance with the contents that are set in the main memory 113 for supplying transmission paths, and matches the contents of the two tables to prepare a succeeding request for the connection of a subscriber with a transmission path.

As is described above, the conventional call control system is realized by the detection of a call change by a subscriber and the transmission of the detected contents (a call control message) to a corresponding exchange, and the connection of the subscriber to a transmission path, in consonance with a call control message received from the exchange, after making an examination to determine whether a contention state involving subscribers and transmission paths has occurred. However, this system is controlled by a call control message for which there is a single, specific protocol, and the system has so small a capacity that only 50 (CH) subscribers can be accommodated.

When many subscribers are to be accommodated, a subscriber transmission device is constituted by combining four of the above described control systems to provide sufficient transmission paths to accommodate 200 (CH) subscribers.

As is described above, the conventional call control system can be located only between an exchange, which supports a call control message in accordance with a single, specific protocol, and a subscriber that is assigned to the exchange. Since a transmission path connection time that is specified by the protocol can not be maintained due to the need to make a determination as to whether or not a contention state involving subscribers and transmission paths has occurred, and due to the load that is imposed because of the need to detect calling, only about 50 (CH) subscribers can be accommodated by one call control system.

It is difficult for such a call control system to increase the switching service types, to enhance the maintenance function upon the request of a subscriber, and to provide a high capacity at a lower manufacturing cost, all of which are subscriber transmission device capabilities that are currently in demand.

SUMMARY OF THE INVENTION

It is therefore one object of the present invention to provide a call control system that can cope with a plurality of exchanges, which support call control messages that are consonant with different protocols.

It is another object of the present invention to provide a call control system that can also be located between subscribers that are accommodated by each of a plurality of exchanges.

It is an additional object of the present invention to provide a call control system for which a maintenance operator, upon the request of a subscriber, can supply special lines by the execution of a demand.

It is a further object of the present invention to provide a call control system that ensures realization of a subscriber transmission device that has a capacity that is sufficient to accommodate ten times the number of subscribers that can be accommodated by a conventional call control system.

To achieve the above objects, according to the present invention, a call control system for a subscriber transmission device, which is located along a transmission path between a subscriber and a plurality of exchanges, for supporting call control messages in accordance with their different protocols, and which, upon a request from the exchange, performs connection and disconnection for the subscriber and the transmission path, comprises: a call control message terminal section, which is provided for each of the protocols that are supported by the plurality of exchanges and which terminates a data link for exchanging a call control message with a corresponding exchange; and a call change data processor for detecting a call change and a clearance by the subscriber, and for requesting the call control message terminal section, which supports a protocol that corresponds to a protocol of an exchange to which the subscriber belongs, to transmit the detected contents to the exchange that supports the protocol.

BRIEF DESCRIPTION OF THE DRAWINGS

FIG. 7 is a diagram showing the operational sequence for connection between a subscriber and a transmission path upon receipt of a call control message from an exchange, following receipt of a command from a maintenance operator, and for an examination to determine whether a contention state exists between subscribers and between transmission paths;

FIG. 15 is a diagram illustrating example structures of a new call/clearance condition table and a previous call/clearance condition table for a conventional system;

FIG. 17 is a diagram illustrating an example structure of a subscriber service management table for a conventional system.

DETAILED DESCRIPTION OF THE PREFERRED EMBODIMENTS

Figure 1:
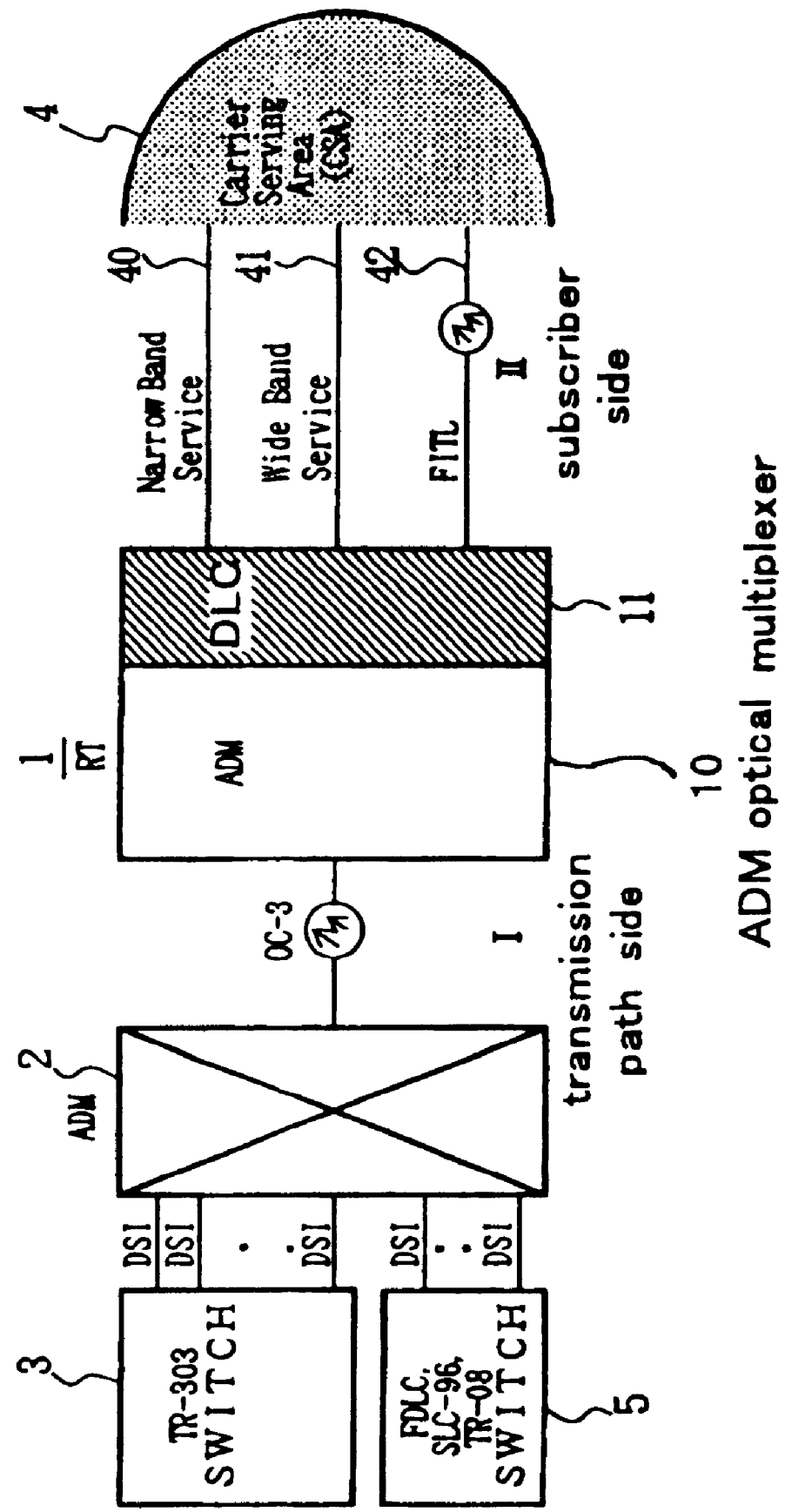
FIG. 1 is a diagram illustrating a digital signal transmission system that applies a call control system of the present invention for a subscriber transmission device.

The preferred embodiments of the present invention will now be described while referring to the accompanying drawings. The same reference numerals are used to denote corresponding or identical components.

FIG. 1 is a diagram illustrating one example structure of a digital signal transmission system that applies a call control system of the present invention for a subscriber transmission device. In FIG. 1, a subscriber transmission device (RT) 1 is placed between a transmission path side I, to which an exchange is to be connected, and a subscriber side II.

Figure 12:
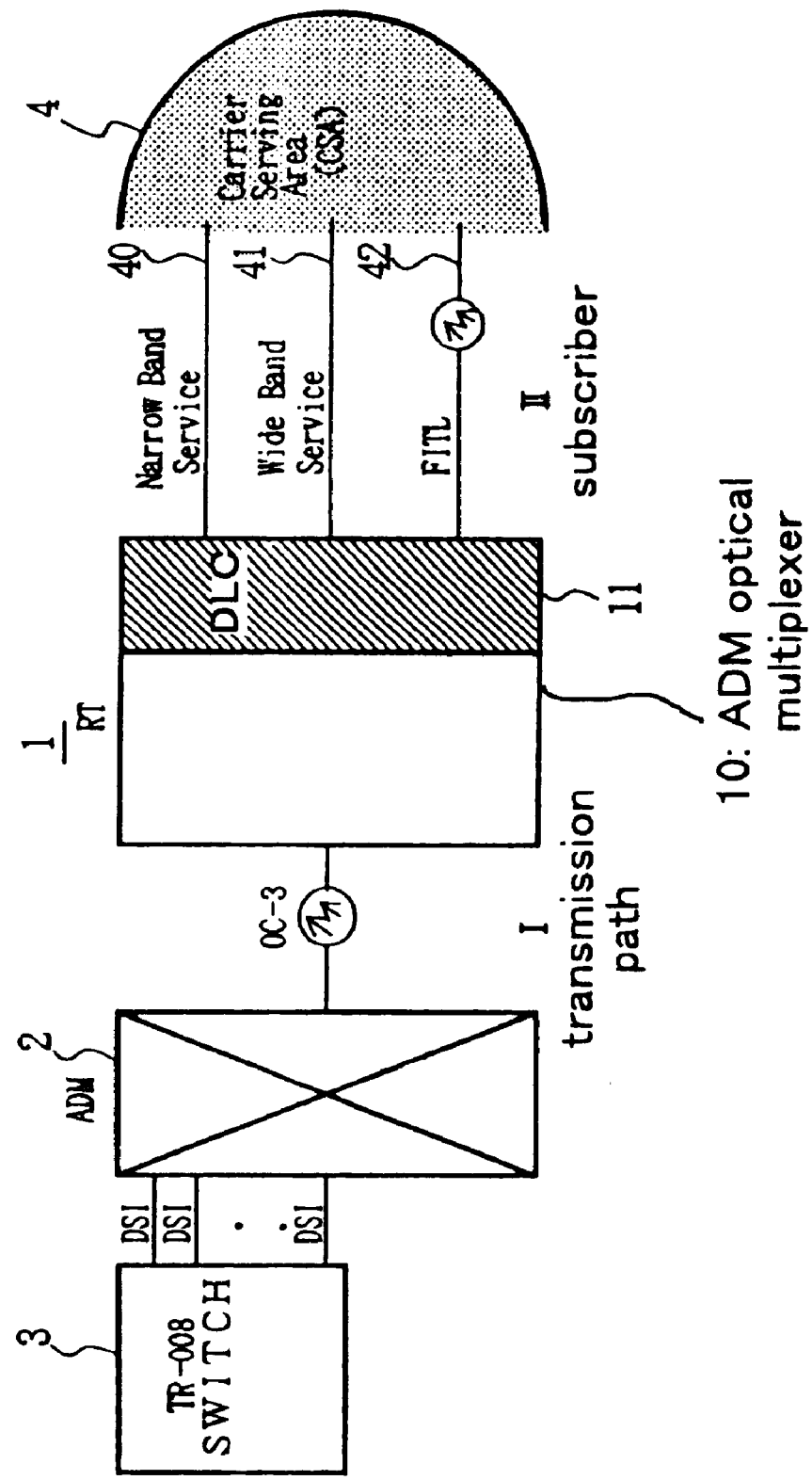
FIG. 12 is a diagram illustrating a digital signal transmission system that applies a conventional call control system for a subscriber transmission device.
Figure 13:
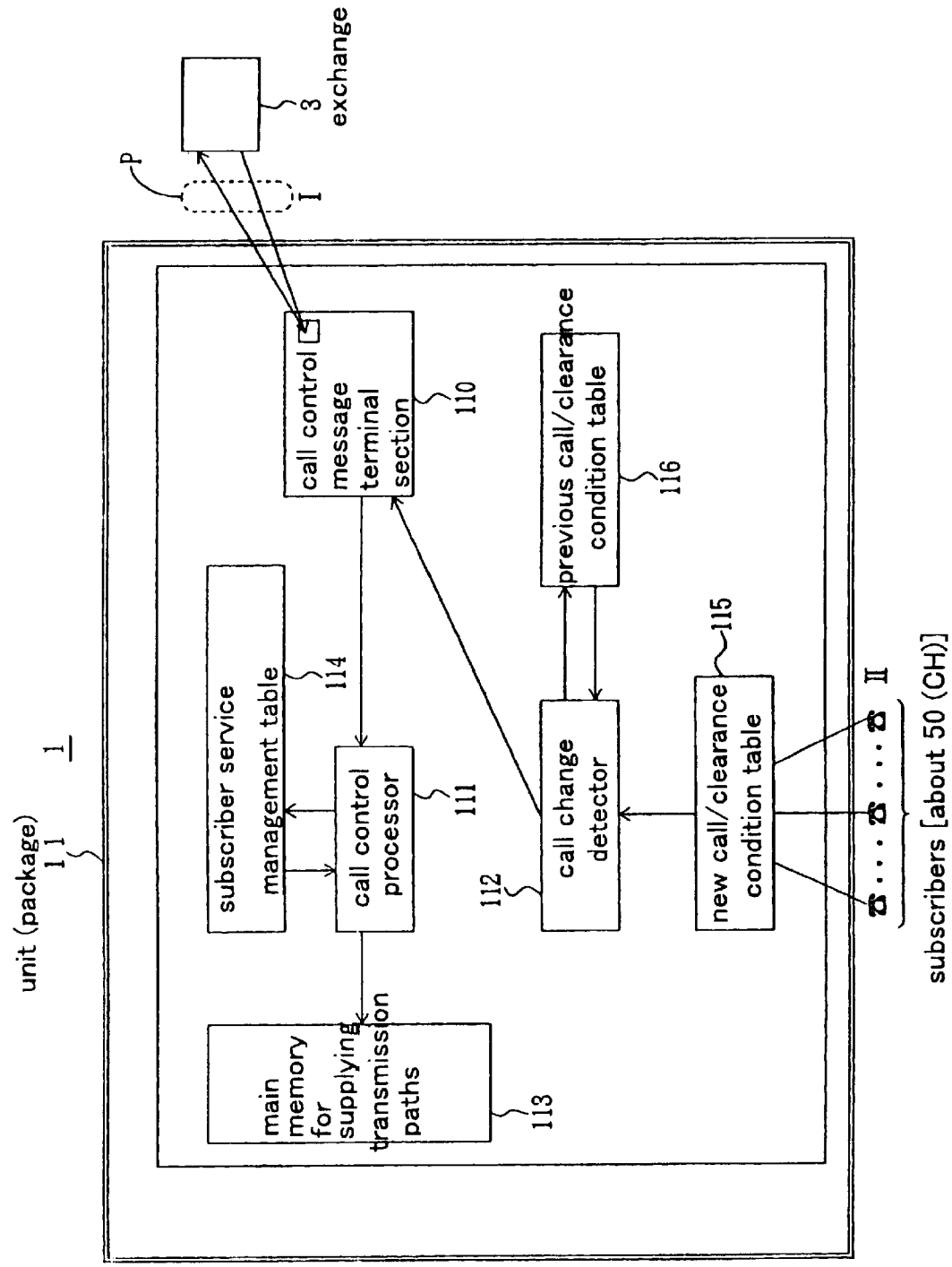
FIG. 13 is a block diagram illustrating one embodiment of a call control system in a conventional subscriber transmission device.
Figure 14:
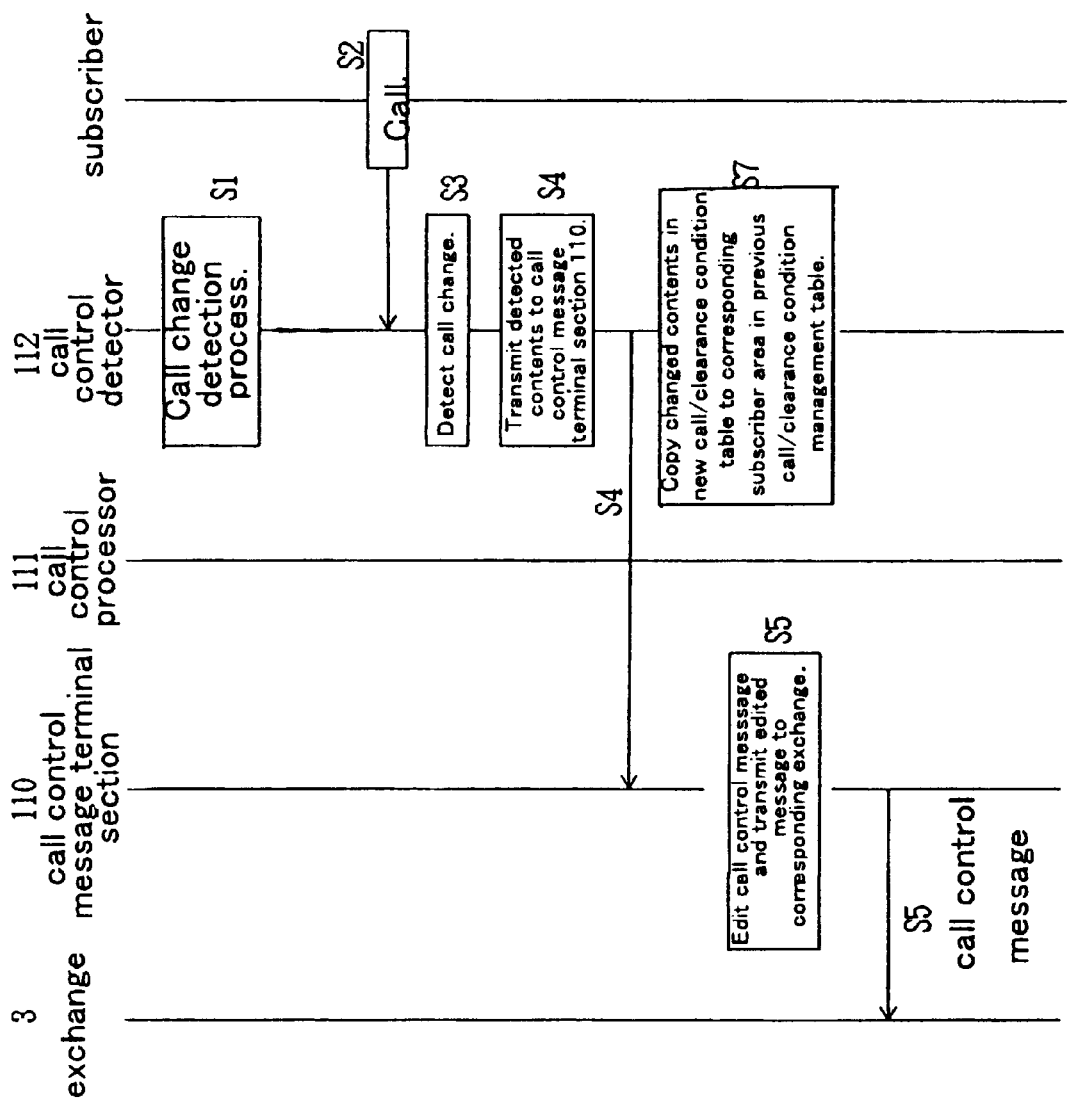
FIG. 14 is a diagram for explaining the operational sequence for detection of a call change of a subscriber and transmission of the detected contents to an exchange in FIG. 13.
Figure 16:
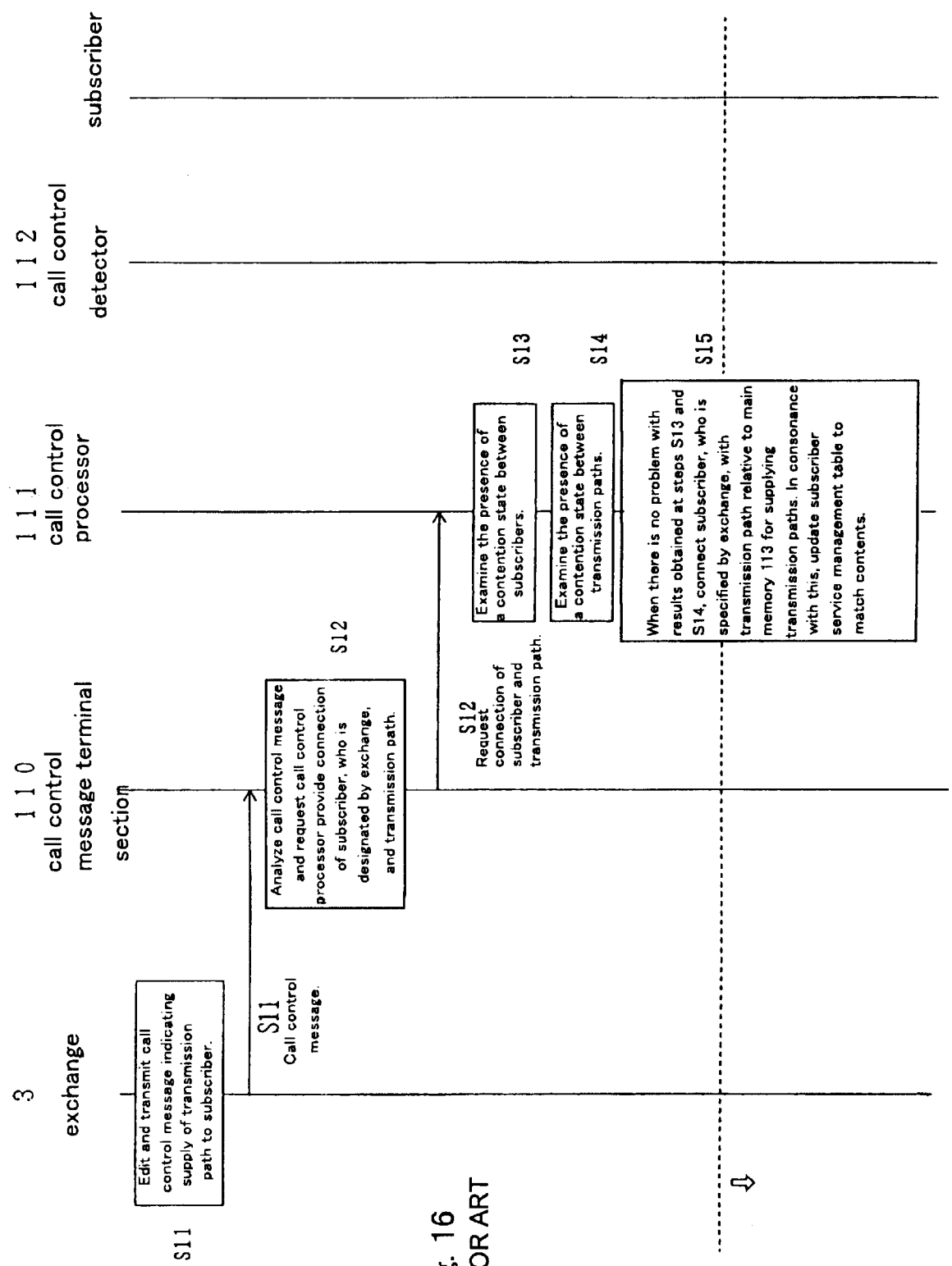
FIG. 16 is a diagram showing the operational sequence for connection between a subscriber and a transmission path upon receipt of a call control message from an exchange, following receipt of a command from a maintenance operator, and for an examination to determine whether or not a contention state exists between subscribers and between transmission paths.
Figure 18:
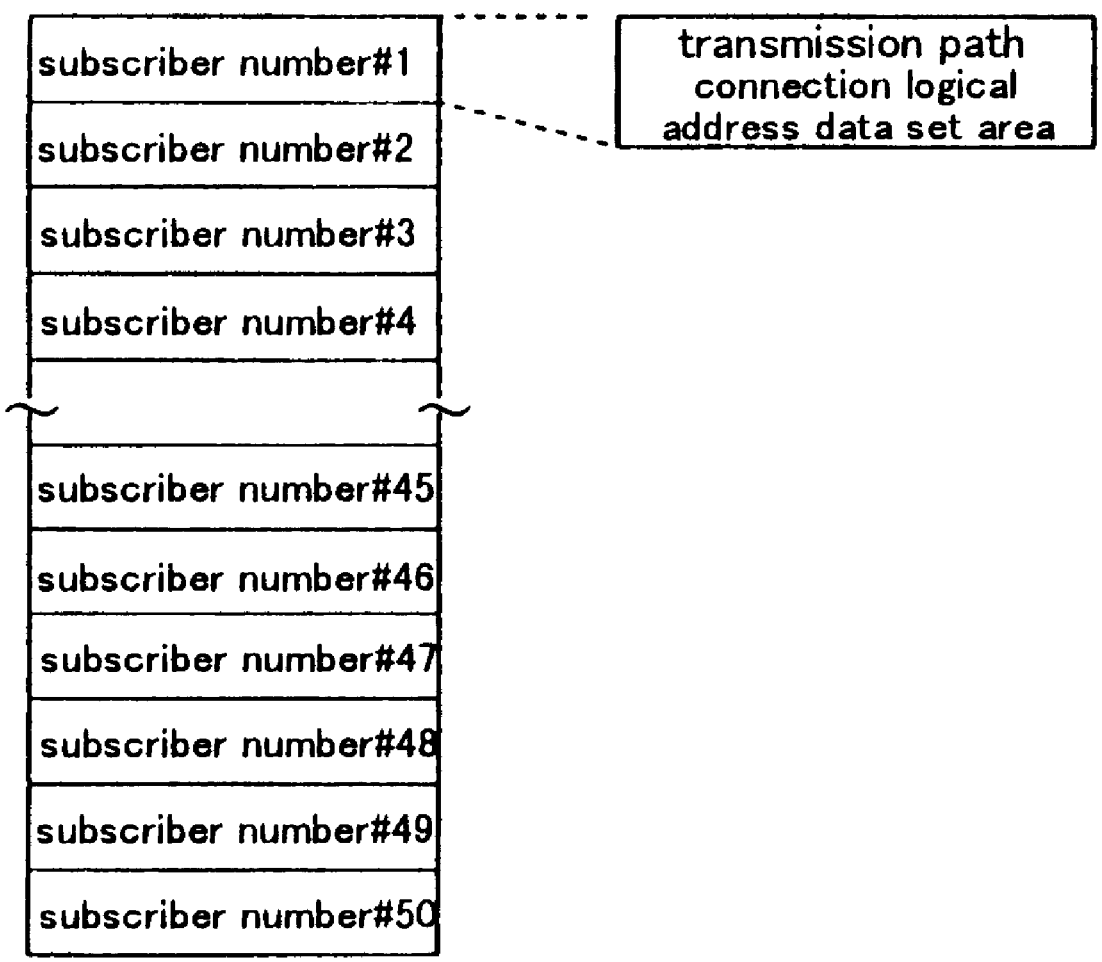
FIG. 18 is a diagram illustrating an example structure of a main memory for supplying transmission paths for a conventional system.

Unlike the conventional example shown in FIG. 12, on the transmission path side I, a call control system 11, which will be described later as the feature of the present invention, is applied so that signals from exchange groups 3 and 5 that support different protocols can be stored. More specifically, in FIG. 1, the exchange group 3 is a digital exchange group that conforms to the specifications of TR303 (a Bellcore document number), and the exchange group 5 is a digital exchange group that conforms to the specifications of TR-008 (also a Bellcore document number). These groups support different protocols.

TR-008 specifies a protocol for a subscriber transmission device (RT) that has a line concentration function of 96 subscribers, such as SLIC-96. The TR303 specifies a protocol for a subscriber transmission device (RT) that possesses a line concentration function of 2016 subscribers. Conventionally, the subscriber transmission device (RT) can communicate only with an exchange that supports TR-008.

DS1 signals of 1.5 Mbps from the exchange group 3 and are transmitted to an ADM device 2, which multiplexes them to obtain optical signals of 150 Mbps. The optical signals are then transmitted across an optical transmission path OC-3 to the subscriber transmission device (RT)

On the subscriber side II, the subscriber transmission device (RT) 1 is connected to a carrier serving area across a narrow band subscriber line 40, which is connected to a local switch or a specific service, a wide band subscriber line 41, for transmission of DS1 and DS3 signals, or an optical fiber subscriber line 42.

Further, the subscriber transmission device (RT) 1 also includes a call control system 11 that provides various services for an add drop optical multiplexer 10 and a subscriber, and sorts subscriber lines and uses the electronic cross connect function to transmit them to the exchange devices.

Figure 2:
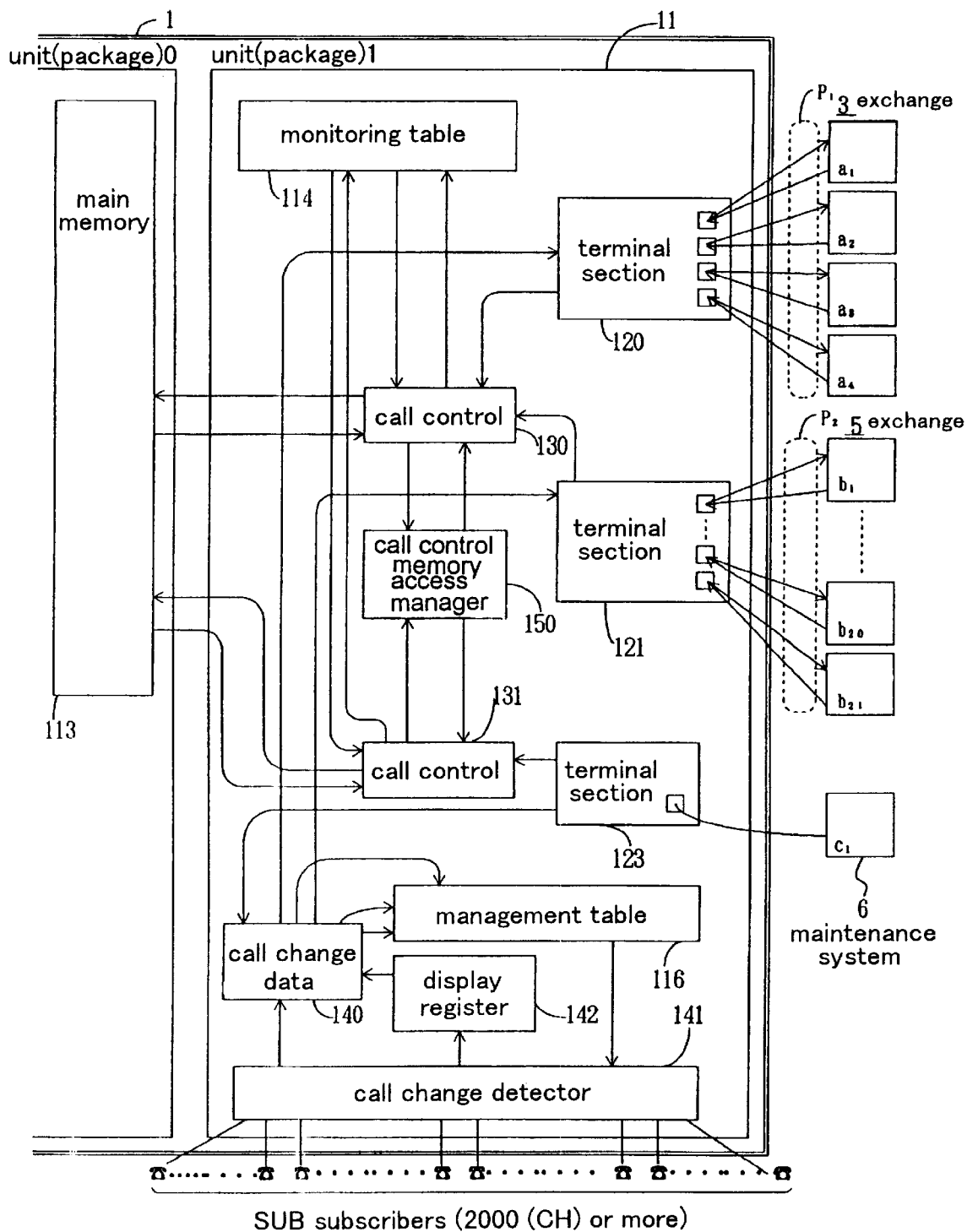
FIG. 2 is a block diagram illustrating one embodiment of a call control system in a subscriber transmission device of the present invention.

FIG. 2 is a block diagram illustrating one embodiment of the call control system 11 of the present invention in the subscriber transmission device (RT) 1 shown in FIG. 1. It should be noted that the application of the present invention is not limited to the exchange groups 3 and 5 shown in FIG. 1.

In FIG. 2, exchanges $a_1$ through $a_4$ are assumed to constitute the exchange group 3 that supports a call control message according to a specific protocol ($p_1$), and exchanges $b_1$ through $b_2$, are assumed to constitute the exchange group 5 that supports a call control message according to a different protocol ($p_2$).

In the present invention, subscribers for 2000 lines (CH) or more can be accommodated. Each subscriber can be controlled by a call control message in accordance with the protocol ($p_1$) or ($p_2$) and can receive various services.

Further, upon a request from a subscriber, a maintenance operator executes a maintenance command through a maintenance system 6. Therefore, in consonance with subscribers that receive service across special lines and the operational form of the device, correspondence between subscribers and the transmission paths used for connection are unconditionally determined, and subscribers for which various services are provided are designated.

A main memory 113 for supplying transmission paths that is provided as a storage device in a unit (package) 0 that is mounted on the subscriber transmission device 1, performs, for each subscriber, connection and disconnection relative to a transmission path.

The following functional sections are provided in a unit (package) 1 to achieve the above described objects of the present invention. Although the functional sections can be constituted by using hardware, they can easily be provided by software.

In FIG. 2, a first call control message terminal section 120 performs a call control sequence, by using calling of a subscriber as a trigger, in consonance with the protocol ($p_1$) of the exchange that belongs to the exchange group 3, analyzes a received message, and transmits the results of the analysis.

A second call control message terminal section 121 performs a call control sequence, by using the call of a subscriber as a trigger, in consonance with the protocol ($p_2$) of the exchange that belongs to the exchange group 5, analyzes a received message and transmits the results of the analysis.

While a maintenance command terminal section 123 regards as a trigger a maintenance command that is received from the maintenance system 6 that is executed by a maintenance operator, it analyzes the received command and transmits the result of the analysis.

A first call control processor 130 employs as a trigger a request from each of the first and the second call control message terminal sections 120 and 121 to set data for connection and disconnection of a transmission path relative to the main memory 113 for supplying transmission paths.

A second call control processor 131 employs as a trigger a request from the maintenance command terminal sections 123 to set the data for connection and disconnection of a transmission path relative to the main memory 113 for supplying transmission paths.

A call change data processor 140 uses as a trigger the occurrence of a call change and a clearance for a subscriber, and requests the first and the second call control message terminal sections 120 and 121 to transmit the contents of the change to the exchange to which the subscriber belongs. Further, the call change data processor 140 manages the number of occurrences of call changes and clearances during a specific period of time.

A call change detector 141 compares for a subscriber the latest call and clearance conditions, which are obtained from a subscriber signal, with previous call and clearance conditions, which are generated by the call change data processor 140, and detects any difference. When the call change detector 141 detects a difference, it transmits the detected data to the call change data processor 140.

A storage device 114 is a transmission path contention monitor table in which are recorded for subscriber data for a connected or a non-connected condition of each transmission path, and service contents that are provided for a corresponding subscriber when connected.

A call control memory access manager 150 manages the accesses of the main memory 113 for supplying transmission paths and the transmission path contention monitoring table 114, so as to avoid the occurrence of contention when they are accessed by the first and the second call control processors 130 and 131.

A call change subscriber display register 142 specifies the number of a subscriber, for which the call change or clearance has been detected, and the detected contents.

A storage device 116 is a call change data management table in which are recorded the previous call and clearance conditions for a subscriber.

As is described above, according to the present invention, provided are the exchange group (exchanges $a_1$ through $a_4$) 3 and the exchange group (exchanges $b_1$ through $b_{21}$) 5, which support, respectively, different call control message protocols ($p_1$) and ($p_2$), and the first and the second call control message terminal sections 120 and 121 that can be placed in opposition, as is shown in the block diagram in FIG. 2 for the embodiment of the present invention.

It is therefore possible to accommodate subscribers for which control is provided by call control messages output in accordance with a plurality of different protocols, and to provide service for these subscribers.

In addition, for each signal CH for control signal transmission and each item of data CH for data transmission by an ISDN subscriber, a transmission path connection area is provided, for the ISDN subscriber as well as for other general subscribers, in the main memory 113 for supplying transmission paths. With this arrangement, it is possible for a connection process between a subscriber and a transmission path to be used in common.

In response to a trigger, the first and the second call control processors 130 and 131 confirm setup data in an area for each subscriber to determine whether or not contention for connection and disconnection exists, both between connection forms for subscribers that are the same and between connection forms that are different.

For the transmission path contention monitoring table 114, at the same time a transmission path is supplied to a subscriber, a table is generated in which is indicated the connection condition of subscribers for each transmission path. When triggered, the first and the second call control processors 130 and 131 refer to this table and determine the contention status among the subscribers for a transmission path, i.e., whether or not a transmission path that is designated by the exchange or the maintenance operator has been connected to another subscriber.

Call change detection mask data are additionally entered in the call change data management table 116 by the unit of subscribers and by the unit of subscribers that are accommodated under a specific protocol. In response to a trigger, the call change data processor 140 sets a mask relative to a pertinent subscriber that is consonant with the contents of the trigger. Through this process, data are added temporarily or continuously, and the detection of call changes and clearances by the call change detector 141 is halted.

Figure 3:
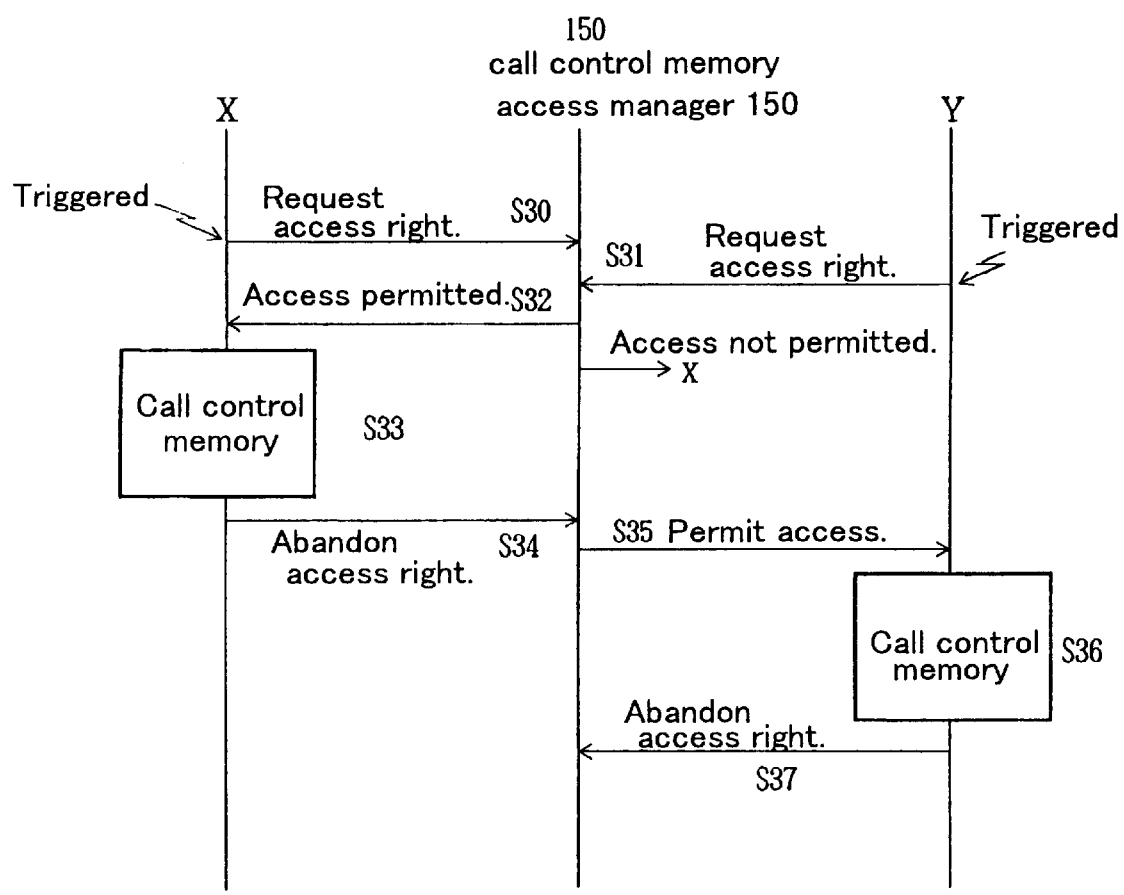
FIG. 3 is a diagram showing the procedures for accessing a call control main memory.

FIG. 3 is a diagram illustrating the procedures for accessing the call control memory. In FIG. 3, X indicates either one of the first and the second call control processors 130 and 131. Y indicates the second call control processor 131 when X denotes the first call control processor 130. When X denotes the second call control processor 131, Y indicates the first call control processor 130.

When X has accessed or generated a trigger to the call control memory, which is the main memory 113 for supplying transmission paths or the transmission path contention monitor table 114(step S30), the call control memory access manager 150 rejects the access by Y (step S31), and permits X to perform an access (step S32).

Therefore, X accesses the call control memory (step S33) and abandons the access right (step S34). Then, access by Y is permitted (step S35), and Y accesses the call control memory (step S36). When the access is terminated, the access right of Y is abandoned (step S37).

Since the access procedures for the call control memory is assigned as a task, it is possible to prevent the first and the second call control processors 130 and 131 from determining that a subscriber and a transmission path that have been connected by one of the call control processors, are the subscriber and the transmission path that have been disconnected by the other call controller processor.

In the example structure in FIG. 2, a unit (package) 0 for including the main memory 113 for supplying transmission paths and a unit (package) 1 for including the other set are separated physically. When both components are provided in a single unit (package), a call control process is disabled by the occurrence of an interference in either component set and the provision of a service is halted. With the structure in FIG. 2, however, such a situation can be prevented.

Further, since separate units are employed, it is possible to prevent the recovery to a transmission path allocation condition from being disabled when an obstacle arises in the main memory 113 for supplying transmission paths, the transmission path contention monitor table 114, or the call change data management table 116.

In addition, since even when a problem occurs in the unit (package) 0 the main memory 113 for supplying transmission paths can be reset based on the data in the transmission path contention monitor table 114 and the call change data management table 116 in the unit (package) 1, the main memory 113 for supplying transmission paths can be quickly recovered to the transmission path allocation condition before the problem has occurred.

Further, even when an obstacle arises in the unit (package) 1, a servicing condition for a subscriber to whom a transmission path is being supplied can be maintained.

The processing of the embodiment shown in FIG. 2 of the present invention will now be described, to include a correlation between individual functional sections.

Figure 4:
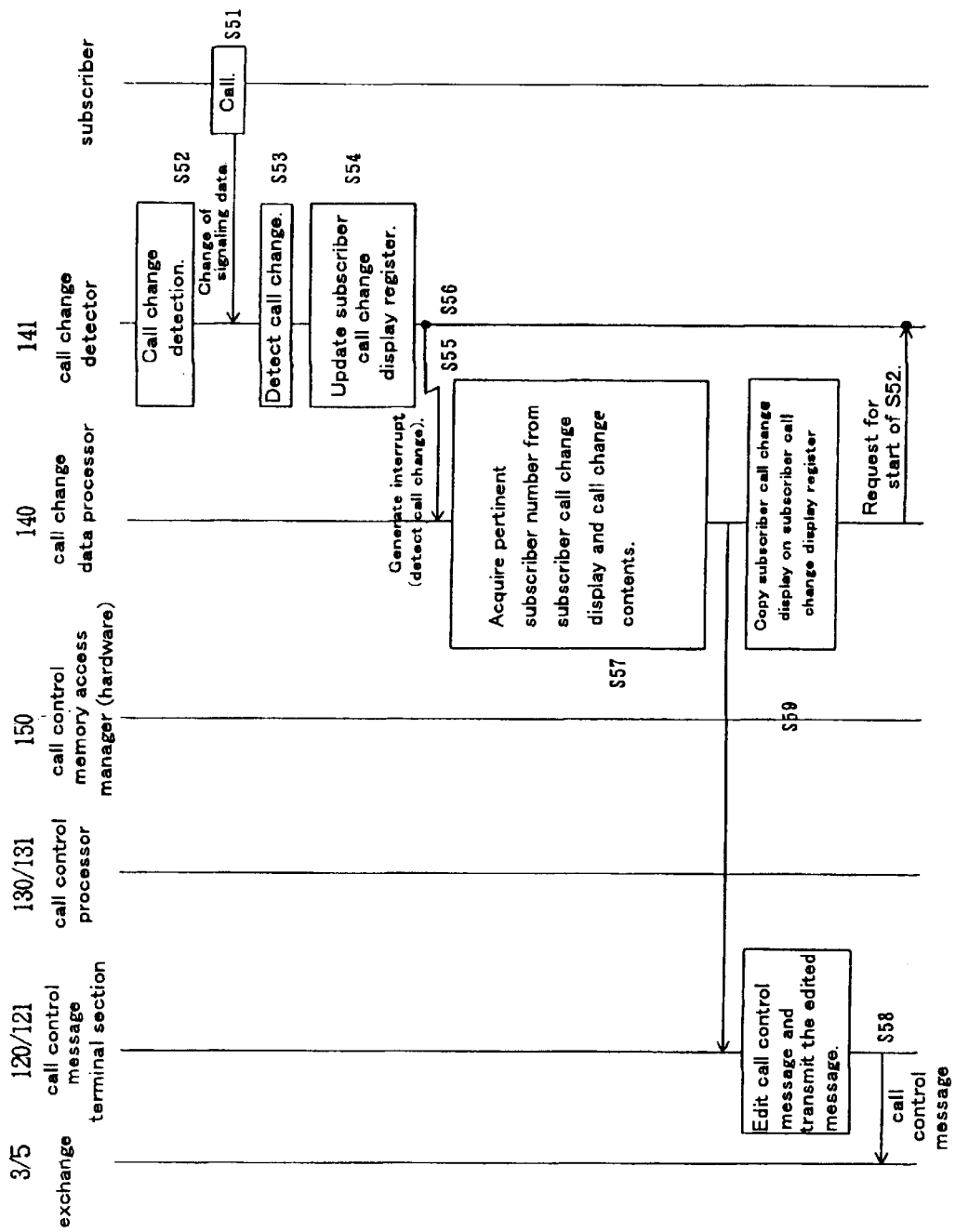
FIG. 4 is a diagram for explaining the operational sequence for detection of a call change for a subscriber and transmission of the detected contents to a exchange.

FIG. 4 is a diagram for explaining the sequential operations performed by the present invention for the detection of a call change by a subscriber and for notifying an opposed exchange of the detected contents.

The call change detector 141 constantly compares the data for the current call and clearance (signaling) of a subscriber (step S51) with the condition in the call change data management table 116, and performs a call change detection process for the subscriber (step S52). When a difference is found as the result of a comparison, the call change by the subscriber is detected (step S53).

Then, the contents of the call change subscriber display register 142 are updated (step S54), and the call detection is transmitted as an interrupt to the call change data processor 140 (step S55). At this time, comparison of the current call and clearance (signaling) data with the condition recorded in the call change data management table 116 is halted (step S56).

Figure 5:
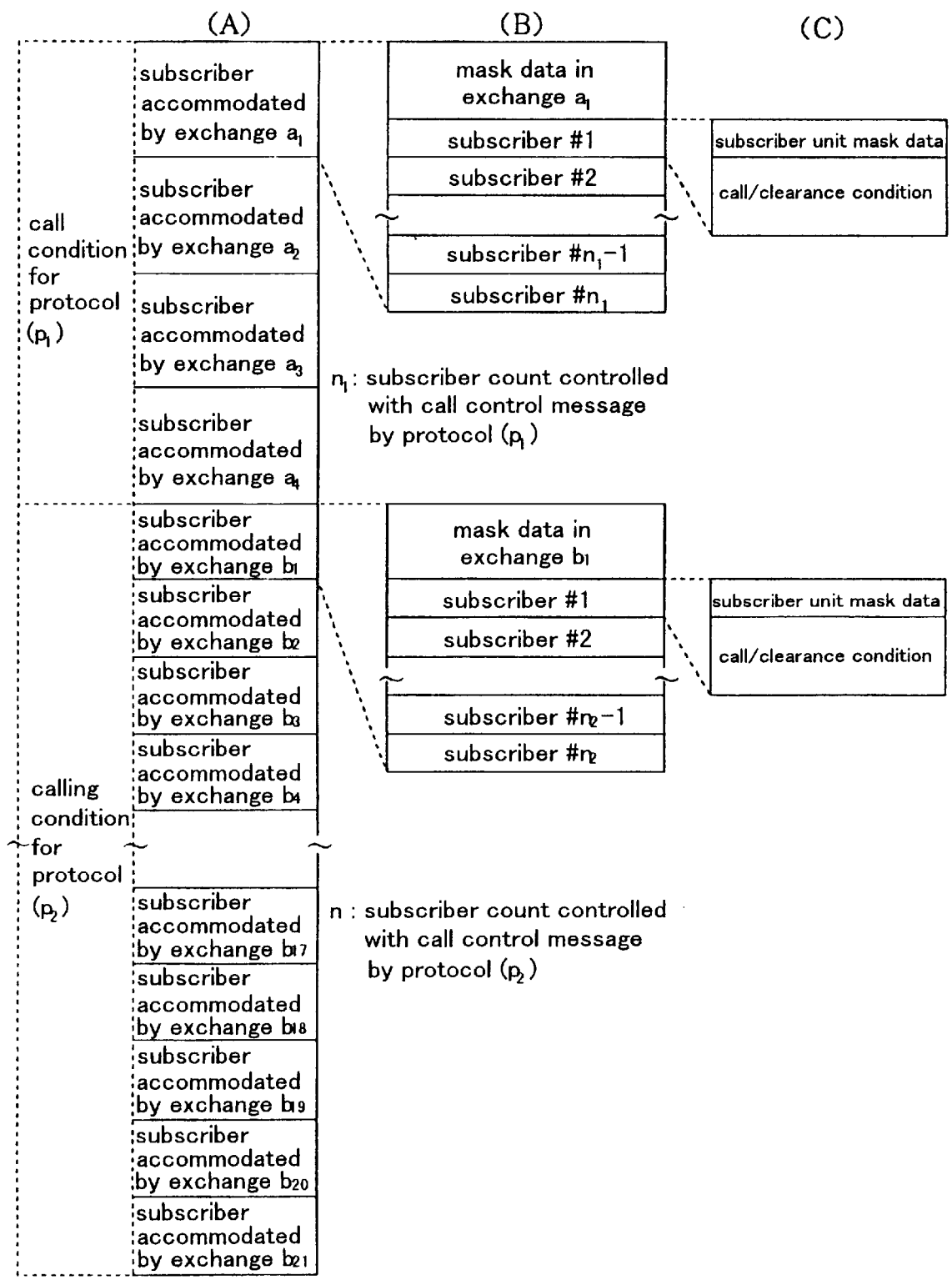
FIG. 5 is a diagram illustrating an example structure of a call change data management table.

The call change data management table 116 has the structure shown in FIG. 5. The calling conditions of the accommodated subscribers are recorded for each of the exchanges ($a_1$ through $a_4$) of the display group 3 and each of the exchanges ($b_1$ through $b_{21}$) of the display group 51 which correspond to the protocols ($p_1$) and ($p_2$) respectively (A).

For subscribers accommodated in each exchange group (B), the call and clearance condition for each subscriber is recorded as subscriber mask data (C).

The following processing is performed by an interrupt issued for a notice that is transmitted from the call change detector 141 to the call change data processor 140 (step S55).

Figure 6:
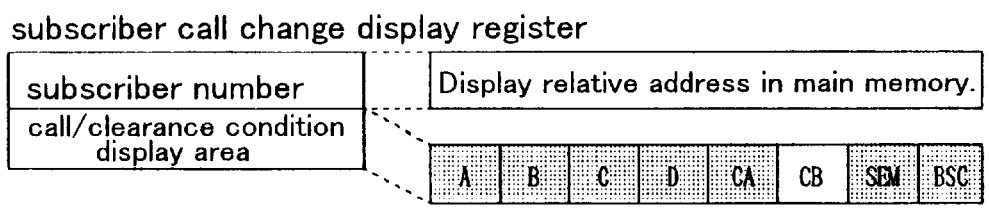
FIG. 6 is a diagram illustrating an example structure of a call change subscriber display register.

In the call change subscriber display register 142 shown in FIG. 6, a relative address of the main memory 113 for supplying transmission paths is set for a subscriber for which a call change is detected, and the new call and clearance condition for that subscriber is also set.

The contents of the call change subscriber display register 142 shown in FIG. 6 will now be explained. As is previously described, this register 142 has an area in which a relative address of the main memory 113 for supplying transmission paths is displayed for a subscriber in consonance with a subscriber number, and an area in which the call and clearance conditions for each subscriber are displayed.

Bits that are set in the subscriber call and clearance condition display area indicate the following:

A through D bits: The condition of a signal on a subscriber line is displayed by this four-bit code. It should be noted that the code form differs depending on the CH unit by which a subscriber is accommodated. The call change processor 140 that does not identify a CH unit type obtains the condition of the subscriber by referring to a CB bit, which will be described later, that is generated by hardware.

CA bit: This bit indicates the line concentration condition; a 0 indicates a long distance call, which is no subject to the line concentration and a 1 indicates a local call, which is subject to the line concentration.

CB bit: This bit indicates the status of a calling or clearance; a 0 indicates a call is in progress and a 1 indicates no call is in progress.

SEM bit: This bit indicates the semi-permanent assignment is set; a 0 indicates a dynamic assignment is set and a 1 indicates a semi-permanent assignment is set where the detection of a call change and a clearance is masked by the call change detector 140.

BSC bit: This indicates a line that does not employ a signaling bit; a 0 indicates the presence of signaling, and a 1 indicates the absence of signaling.

The call change data processor 140 that has received a call change refers to the call change subscriber display register 142 to obtain a subscriber number. The call change data processor 140 then requests the transmission of a call control message to the exchange, relative to the first call control message terminal section 120 or the second call control message terminal section 121, which edits and transmits a call control message in accordance with a protocol that is supported by the exchange that accommodates a subscriber having the pertinent subscriber number (step S57).

A source OS is used for this request. This request process is performed by the call change data processor 140 notifying an exchange of data for a subscriber that are converted in consonance with a protocol, which is supported by a requested destination.

The first call control message terminal section 120 or the second call control message terminal section 121, which has received the request for the transmission of the call control message, edits a call control message and transmits the edited message to the pertinent exchange group 3 or 5 (step S58).

The call change data processor 140 that has been notified of the detection of the call change copies the contents of the call change subscriber display register 142 to an area for the pertinent subscriber in the call change data management table 116 (step S59). Through this process, the call change detector 141 resumes the periodical detection process for detecting the occurrence of a call change by a subscriber. When a call change for a subscriber has occurred, the processing at step S53 and the following steps is repeated.

FIG. 7 is a diagram illustrating the operating sequence for a connection between a subscriber and a transmission path upon the receipt of a call control message from an exchange and of a command from a maintenance operator, and for determining the contention state between the subscribers and between the transmission paths.

An exchange that belongs to the exchange group 3 or 5 edits a call control message detailing the supply of a transmission path to a subscriber (step S61). The edited call control message is transmitted by the exchange to the corresponding call control message terminal section 120 or 121 (step S62).

The call control message terminal section 120 or 121, which has received the call control message, analyzes the message and requests the call control processor 130 to connect a subscriber, who is designated by the exchange, with a transmission path (step S63).

The source OS is used for this request. This requesting process is performed by transmitting to the call control processor 130 the result of the analysis of the received call control message.

The call control processor 130 that has requested that a connection be made between a subscriber and a transmission path requests the call control memory access manager 150 to grant it the right to access the call control memory, which corresponds to the main memory 113 for supplying transmission paths and the transmission path contention monitoring table 114 (step S64).

When the call control processors 130 and 131 are not accessing the call control memory, which corresponds to the main memory 113 for supplying transmission paths and the transmission path contention monitoring table 114, the call control memory access manager 150 transmits to the call control processor 130 the right to access the call control memory by performing an interruption in accordance with the call control memory accessing procedures explained while referring to FIG. 3 (step S65).

Figure 9:
FIG. 9 is a diagram illustrating an example structure for each subscriber in FIG. 8.
Figure 8:
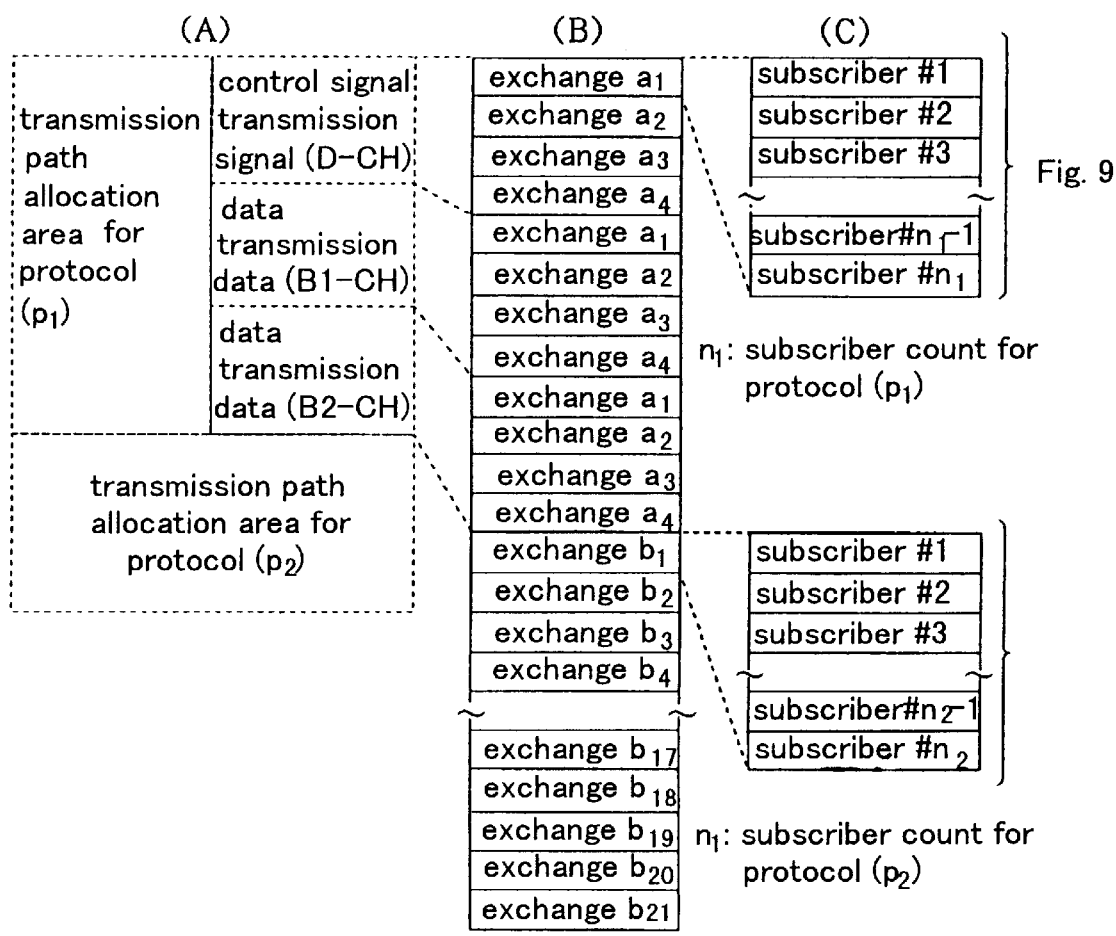
FIG. 8 is a diagram illustrating an example structure of a main memory for supplying transmission paths.

The call control processor 130 that is given permission to access the call control memory refers to the connection form identification data, for a pertinent subscriber, and the transmission path connection logical address data in the main memory 113 for supplying transmission paths shown in FIGS. 8 and 9, and determines whether or not a contention state exists between the subscribers (step S66).

For the determination of the presence of a contention state between subscribers, a check is performed to determine whether or not a subscriber who is specified by an exchange is already connected to a transmission path that differs from the transmission path that is designated by the exchange.

The processing, when as a result it is found that a contention state exists, differs depending on the processing error specified for the a protocol that is supported by the exchange.

The structure of the main memory 113 for supplying transmission paths shown in FIGS. 8 and 9 will be further described. In FIG. 8, exchanges $a_1$ through $a_4$ are accommodated for each of D-CH area, B1-CH area and B2-CH area of each exchange in the exchange groups 3 and 5 that support the protocols ($p_1$) and ($p_2$) (B). A subscriber number area is assigned to each of a plurality of subscribers that are accommodated by each exchange (C).

In FIG. 8, $n_1$ denotes the number of subscribers that can be controlled with a call control message prepared in accordance with the protocol ($p_1$), and $n_2$ denotes the number of subscribers that can be controlled with a call control message according to the protocol ($p_2$).

In the subscriber number area (C), a connection form identification data setting area (a) and a corresponding transmission path connection logical address data setting area (b) are provided for each unit of subscribers, as is shown in FIG. 9.

Figure 10:
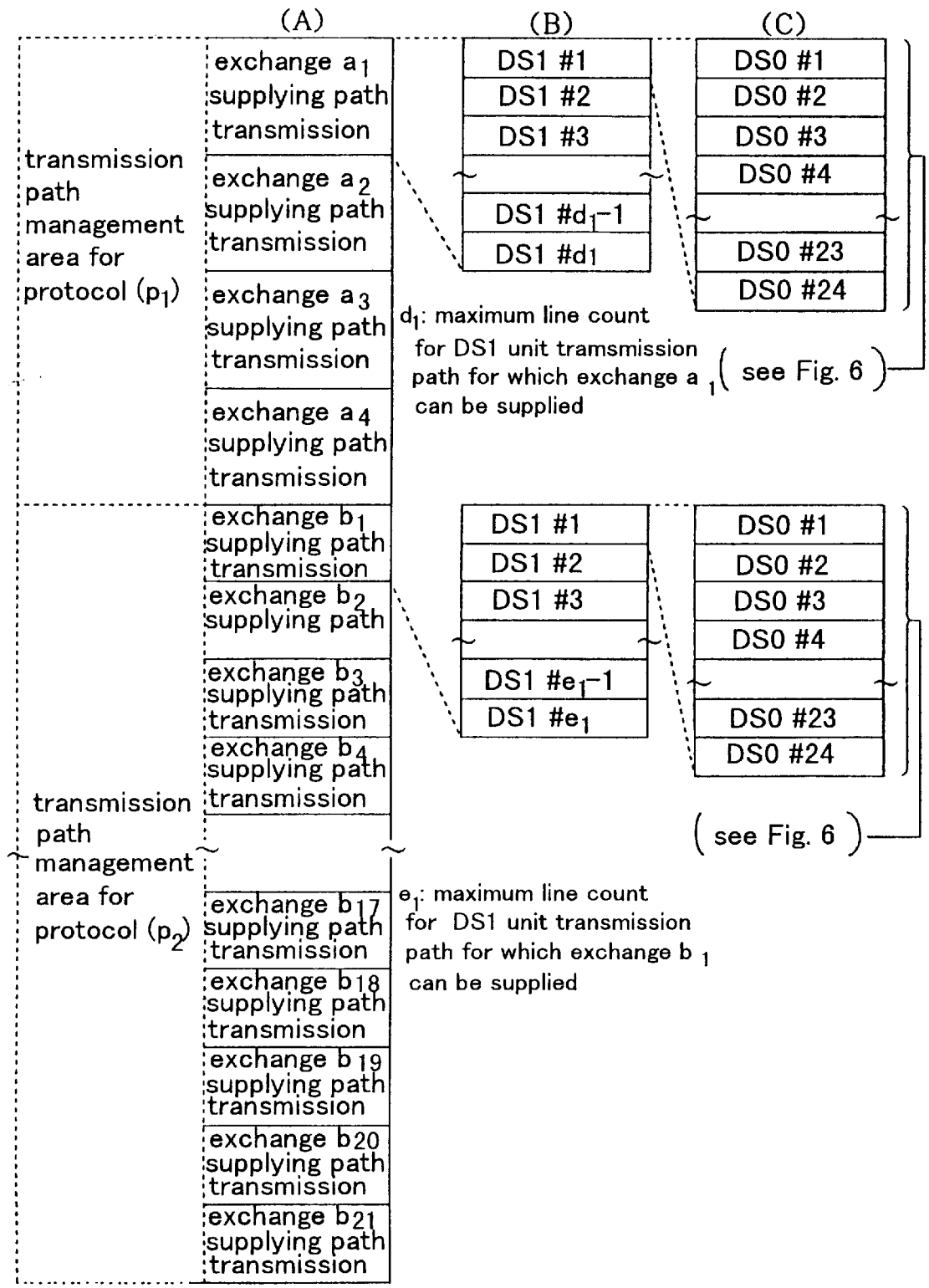
FIG. 10 is a diagram illustrating an example structure of a transmission path contention monitor table.

The call control processor 130 refers to the subscriber data, for which a transmission path is allocated, in the transmission path contention monitor table 114, the structure of which is shown in FIGS. 9 and 10, and determines the existence of contention between transmission paths (step S67).

For determination of the existence of contention between the transmission paths, a check is performed to determine whether or not a transmission path that is designated by an exchange is already connected to a subscriber who is different from a subscriber specified by the exchange.

The process performed, when it is found as a result that a contention state exists, differs depending on the processing error specified for the protocol that is supported by the exchange.

Figure 11:
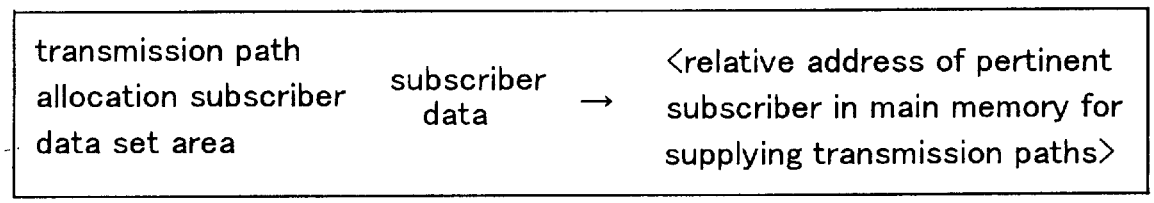
FIG. 11 is a diagram illustrating an example structure for each subscriber in FIG. 10.

The structure of the transmission path contention monitoring table 114 in FIGS. 10 and 11 will be further explained. In FIG. 10, a management area for a transmission path to be supplied to an accommodated subscriber is provided for each of the exchange groups that support the respective protocols ($p_1$) and ($p_2$). Each of the areas has an area that corresponds to an exchange that belongs to the exchange group (A).

DS1 numbers that are equivalent to the maximum line count $d_1$ of the DS1 unit transmission path that a single exchange can supply (the maximum line count $q_1$ in the protocol ($p_2$) group) (B). One DS1 number possesses DS0 number areas that are the equivalent of 24 lines (C).

As is shown in FIG. 11, a single DS0 number area includes an area in which data for a subscriber that is a transmission path allocation destination is set, and a relative address, as subscriber data, of a corresponding subscriber in the main memory 113 for supplying transmission paths.

When it is ascertained that no contention exists between the subscribers and between the transmission paths, by referring to the main memory 113 for supplying transmission paths, the call control processor 130 connects the subscriber to a transmission path that is designated by an exchange. The call control processor 130 updates the transmission path contention monitoring table 114 in consonance with the contents set in the main memory 113 for supplying transmission paths, so that the contents of both match (step S68).

When the call control processor 130 has connected the subscriber to the transmission path and has updated the management data, it notifies the call control memory access manager 150 of the abandonment of the call control memory access right.

The processing for connecting a subscriber and a transmission path upon receipt of a command from a maintenance operator via the maintenance system 6 is performed in substantially the same manner as in the sequence shown in FIG. 7. The maintenance command terminal section 123 that has received a maintenance command requests the call control processor 131 to make the connection with a transmission path for a subscriber that is specified by the maintenance command.

Upon a request for the connection of the subscriber and the transmission path, the call control processor 131 acquires a call control memory access right by using the same procedures as those for the call control processor 130, and determines whether or not a contention state exists between the subscribers and between the transmission paths. Further, the call control processor 131 connects the subscriber and the transmission path by referring to the main memory 113 for supplying transmission paths, updates the transmission path contention monitoring table 114, and abandons the call control memory access right.

An explanation will now be given for the process for transmitting a notification from a maintenance operator of a change in the operational mode, and for the halting of the detection process for a call change when the system is overloaded.

From a maintenance operator via the maintenance system 6, the maintenance command terminal section 123 receives a maintenance command that indicates the halting of the detection of a call change for a subscriber, who is accommodated by the exchange $a_1$ and that supports a call control message according to the protocol ($p_1$). Upon receipt of the command, the maintenance command terminal section 123 instructs the call change data processor 140 to halt the detection of call changes for a subscriber accommodated by the exchange $a_1$. This instruction is issued by using the source OS.

Upon the receipt of the instruction, the call change processor 140 enters data that indicates the halting of the detection of call changes for a subscriber accommodated by the exchange $a_1$ into the mask data area in the call change data management table 116 in FIG. 5. As a result, until the setup indicating the halting of the detection of a call change is canceled, the call change detector 141 does not perform a comparison process to detect a call change for a subscriber for which the detection of call changes is halted.

When the maintenance command is issued by a maintenance operator, instructing the halting of the detection of call changes for a specific subscriber, the same procedures are performed. The call change data processor 140 enters data indicating the halting of the detection of call changes into subscriber mask data in the call change data management table 116, and halts the detection of call changes relative to the specific subscriber.

When frequent changes occur in the call and clearance conditions for a plurality of subscribers accommodated by the exchange $b_1$, which supports a call control message according to the protocol ($p_2$), and when the call change data processor 140, which manages the detection frequency of the call and clearance condition changes for a specified period of time, determines that the transmission path connection period specified according to the protocol ($p_2$) can not be maintained due to the overload of the system, in the same procedures, the call change detection data processor 140 performs a setup that indicates the halting of the detection of call changes by the unit of the subscribers accommodated by the exchange $a_1$ (protocol $p_1$), in the mask data area of the call change data management table 116, until the detection frequency of the call and clearance condition change within a specified period of time is reduced, and is equal to, or lower, than a standard that is systematically specified.

As is described above in detail, according to the present invention, provided is a call control system, for a subscriber transmission device that can be located opposite to exchanges that support a call control message by using different protocols, that prevents an abnormal operation due to contention, and that satisfactorily maintains a service condition and quickly recovers to an original condition even when an obstacle arises in a unit (package), so that various services can be efficiently provided for subscribers that are accommodated by its high accommodation capacity.

What is claimed is:

1. A call control system for use in a subscriber transmission device located along a transmission path between subscribers and exchanges for performing upon requests from the exchanges, connection and disconnection of the subscribers with the transmission path, the call control system comprising:

plural call control message terminal sections, each provided for one of different protocols, each supported by one of groups of exchanges, for terminating a data link for sending and receiving a call control message to and from a corresponding exchange; and a call change data processor for detecting call and clearance by a subscriber, and for requesting one of the plural call control message terminal sections, which is provided for a protocol supported by a group of exchanges to one of which the subscriber is connected, to transmit detected contents of the call and clearance to the corresponding exchange.

2. The call control system according to claim 1, and further comprising:

a first call control processor operatively connected to the plural call control message terminal sections for receiving from one of the plural call control message terminal sections, which supports one of the different protocols for a group of exchanges, to one of which a subscriber is connected, contents requested from the one exchange, based on a call sent from or to a subscriber, and for connecting and disconnecting the subscriber with the transmission path in consonance with the requested contents.

3. The call control system according to claim 2, and further comprising:

a call change detector for comparing call and clearance conditions for a subscriber that are output by the call change data processor with the latest call and clearance conditions that are received from the subscriber to detect any difference as a change of condition and for transmitting data of subscriber for which the changed condition is detected and the detected contents to the call change data processor.

4. The call control system according to claim 3, further comprising a maintenance command terminal section for terminating a request sent from a subscriber and a command requesting the connection and disconnection of a fixed transmission path sent from a maintenance system, which manages an operational form for a protocol that is supported by an exchange; and a second call control processor for providing a special line based on the request of the subscriber, and for receiving a notice of a change in the operational form for the protocol from the maintenance command terminal section and performing a fixed connection and disconnection of the subscriber and the transmission path.

5. The call control system according to claim 3, further comprising a main memory for storing data of connection and disconnection of transmission paths for each of subscribers, wherein the first call control processor sets the data of connection and disconnection corresponding to each of the subscribers in storage areas of the main memory, thereby to perform the connection and the disconnection for each of the subscribers with the transmission paths.

6. The call control system according to claim 4, further comprising a main memory for storing data of connection and disconnection of transmission paths for each of subscribers, wherein the second call control processor sets the data of connection and disconnection corresponding to each of the subscribers in storage areas of the main memory, thereby to perform the connection and the disconnection for each of the subscribers with the transmission paths.

7. The call control system according to claim 5, further comprising a transmission path contention monitor table in which are stored data indicating a connected condition and a non-connected condition for each transmission path relative to a subscriber, said data being generated at the same time as the data for connection and disconnection of the transmission path are set in the main memory; and a call control memory access management section operatively connected to the transmission contention monitor table for inhibiting the first and the second call control processors from accessing to the main memory, so that connection and disconnection are not performed at the same time for the same subscriber and the same transmission path, based on the data indicating the connected condition and the non-connected condition of each transmission path relative to the subscribers.

8. The call control system according to claim 3, further comprising a call change subscriber display register for displaying a subscriber, for which a call change and a clearance are detected by the call change detector, and the detected contents; and a call change data management table indicating current call and clearance conditions for each subscriber, wherein the contents of the call change subscriber display register are set into the call change data management table by the call change data processor, and the call change detector compares the contents of the call change data management table with an input from a subscriber to detect a call change and a clearance by the subscriber.

9. The call control system according to claim 3, wherein the subscriber is an ISDN subscriber, for which both a signal channel (D-CH) for control signal transmission and a data channel (B1/B2-CH) for data transmission are provided for a single subscriber number; the main memory having storage areas for the signal channel and the data channel for each subscriber; the call control message terminal section analyses a message received from the exchange to determine a channel to be connected, and reports the analysis result to the first call control processor; and upon receipt of the analysis result, the first call control processor sets the data for connection and disconnection of a transmission path with a corresponding signal channel or data channel of a subscriber that matches the results obtained by the analysis.

10. The call control system according to claim 7, wherein before accessing the main memory, the first and the second call control processors determine refer the transmission path contention monitor table, determine whether or not a transmission path for which connection is requested has been connected to a subscriber, and do not set data in the main memory for supplying transmission paths when it is determined it has been so connected.

11. The call control system according to claim 3, wherein the main memory includes an additional area in a storage location for each subscriber and stores in the additional area a connection form for a specific subscriber that has been connected to a transmission path.

12. The call control system according to claim 11, wherein when connection with a transmission path by dynamic assignment is requested from the exchange for a subscriber that has been connected to another transmission path by dynamic assignment, contention checking and a corresponding process are performed based on connection form data that are stored in the main memory.

13. The call control system according to claim 11, wherein when connection with a transmission path by semi-permanent assignment is requested from the maintenance operator for a subscriber that has been connected to another transmission path by dynamic assignment, contention checking and a corresponding process are performed based on connection form data that are stored in the main memory.

14. The call control system according to claim 11, wherein when, upon receipt of notice for a change in an operational form, connection with a transmission path by permanent assignment is requested from the maintenance operator for a subscriber that has been connected to another transmission path by dynamic assignment, contention checking and a corresponding process are performed based on connection form data that are stored in the main memory.

15. The call control system according to claim 11, wherein when connection with a transmission path by dynamic assignment is requested from the exchange for a subscriber that has been connected to another transmission path by semi-permanent assignment, contention checking and a corresponding process are performed based on connection form data that are stored in the main memory.

16. The call control system according to claim 11, wherein when connection with a transmission path by semi-permanent assignment is requested from the maintenance operator for a subscriber that has been connected to another transmission path by semi-permanent assignment, contention checking and a corresponding process are performed based on connection form data that are stored in the main memory.

17. The call control system according to claim 11, wherein when, upon receipt of notice for a change in an operational form, connection with a transmission path by permanent assignment is requested from the maintenance operator for a subscriber that has been connected to another transmission path by semi-permanent assignment, contention checking and a corresponding process are performed based on connection form data that are stored in the main memory.

18. The call control system according to claim 11, when connection with a transmission path by dynamic assignment is requested from the exchange for a subscriber that has been connected to another transmission path by permanent assignment, contention checking and a corresponding process are performed based on connection form data that are stored in the main memory.

19. The call control system according to claim 11, wherein when connection with a transmission path by the semi-permanent assignment is requested from the maintenance operator for a subscriber that has been connected to another transmission path by permanent assignment, contention checking and a corresponding process are performed based on connection form data that are stored in the main memory.

20. The call control system according to claim 11, wherein when, upon receipt of notice for a change in an operational form, connection with a transmission path by permanent assignment is requested from the maintenance operator for a subscriber that has been connected to another transmission path by permanent assignment, contention checking and a corresponding process are performed based on connection form data that are stored in the main memory for supplying transmission paths.

21. The call control system according to claim 11, wherein when disconnection of a transmission path is requested from the maintenance operator for a subscriber that has been connected to the transmission path by permanent assignment, contention checking and a corresponding process are performed based on connection form data that are stored in the main memory.

22. The call control system according to claim 11, wherein when disconnection of a transmission path is requested from the exchange for a subscriber that has been connected to the transmission path by permanent assignment or semi-permanent assignment, contention checking and a corresponding process are performed based on connection form data that are stored in the main memory.

23. The call control system according to claim 8, wherein when during the operation of the system a call detection process for a specific subscriber is to be halted upon a request from a maintenance operator, call detection for the specific subscriber is masked in the call change data management table.

24. The call control system according to claim 8, wherein when, during the operation of the system, a notice of a change in the operational form is received from the maintenance operator and a call detection process for all the subscribers included in a specific protocol is to be halted, call detection by the unit included in the exchange of the specific protocol is masked relative to the call change data management table.

25. The call control system according to claim 5, wherein a unit including the main memory is physically separated from a unit for accommodating the other functional sections.

* * * * *